Figure 1:
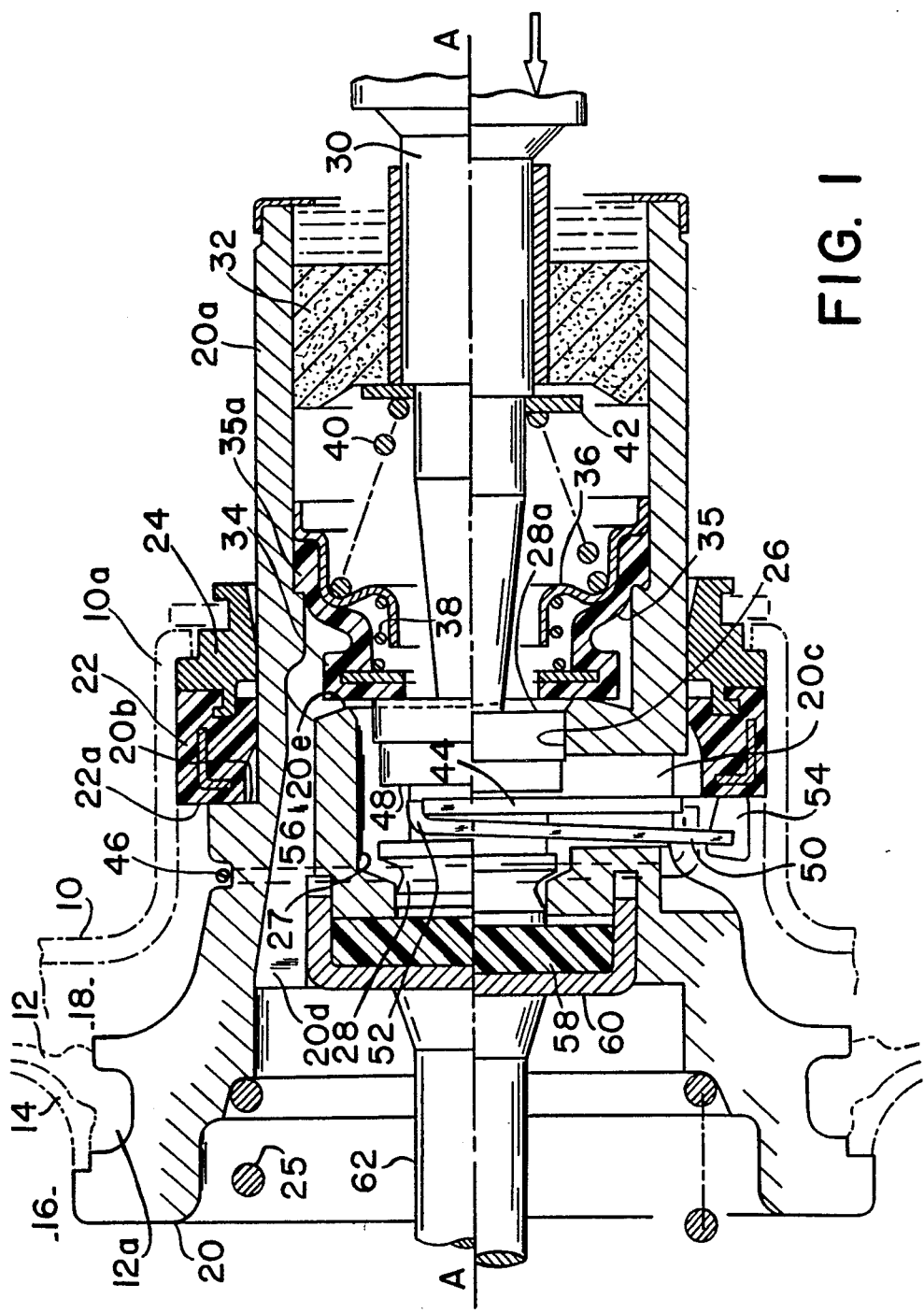

United States Patent [19]

Gautier et al.

[11] Patent Number: 4,934,249
[45] Date of Patent: Jun. 19, 1990

[54] PROCEDURE FOR SETTING THE DEAD TRAVEL OF A SERVO-MOTOR FOR ASSISTANCE DURING BRAKING

[75] Inventors: Jean-Pierre Gautier, Aulnay sous Bois; Perez Miguel, Argenteuil, both of France

[73] Assignee: Bendix France, Drancy, France

[21] Appl. No.: 299,571

[22] Filed: Aug. 5, 1988

[51] Int. Cl.[5] .................................................. F15B 9/10
[52] U.S. Cl. .................................. 91/369.3; 91/376 R; 91/471
[58] Field of Search ............... 91/369.1, 369.2, 369.3, 91/376 R, 471

[56] References Cited

U.S. PATENT DOCUMENTS

| 4,545,206 | 10/1985 | Kobayashi | 91/376 R |
|-----------|---------|-----------|----------|
| 4,577,548 | 3/1985  | Gautier   | 91/369 A |
| 4,594,937 | 6/1986  | Meynier   | 91/376 R |
| 4,817,500 | 4/1989  | Gautier   | 91/376 R |

FOREIGN PATENT DOCUMENTS

| 0153888 | 9/1984 | European Pat. Off. . |
| 2064690 | 6/1981 | United Kingdom . |

*Primary Examiner*—Robert E. Garrett
*Assistant Examiner*—John Ryznic
*Attorney, Agent, or Firm*—Larry J. Palguta; Ken C. Decker

[57] ABSTRACT

The setting of the dead travel of a servo-motor for assistance during braking is carried out in the factory during its assembly. For this purpose, a subassembly (68) comprising the piston (20), the operating pushrod (30) and its plunger (28), the valve head (34), the springs (38, 40) and the fixed (44) and tilting (50) keys, is placed in a setting sleeve (70). A load (F1) is exerted on the front face of the piston (20) sufficient to maintain a bearing surface (20b) permanently against a reference surface (70a) formed on the sleeve, and the pushrod (30) is freed from the action of the spring (40) by means of a fork (70a) formed on the sleeve, and the pushrod (30) is freed from the action of the spring (40) by means of a fork (72), after having pushed the plunger (28) up against the valve head (34) by applying a load (F3), the movement (Δ) made by the mobile key (50) is measured between the reference surface (170a) and a shoulder formed on the plunger (28). A stop is then calibrated by giving it a length equal to the movement (Δ) measured, less the dead travel desired and this calibrated stop is fixed at the end of the mobile key (50).

6 Claims, 3 Drawing Sheets

PROCEDURE FOR SETTING THE DEAD TRAVEL OF A SERVO-MOTOR FOR ASSISTANCE DURING BRAKING

The invention concerns -a procedure for setting the dead travel of a servo-motor for assistance during braking with precision, before its installation on a vehicle.

The invention applies advantageously to all automobile vehicles whose braking circuit is equipped with a servo-motor.

In particular, the invention concerns a servomotor for assistance during braking such as that which is described in U.S. Pat. No. 4,765,226 owned by Sociéé0 BENDIX FRANCE.

The servo-motor described in this document is of conventional design. It comprises notably an outer casing in which a front chamber and a rear chamber are formed on either side of a flexible diaphragm, fixed sealingly on a mobile hollow piston according to the axis of the servomotor. The front chamber is connected permanently to a source of vacuum, whereas the rear chamber communicates either with the front chamber or with the outside atmosphere, via two valves controlled by a common valve head. The positions occupied by these valves depend on the position of an operating pushrod connected to the brake pedal and arranged according to the axis of the servo-motor, in the inside of the hollow piston. More precisely, the front end of the operating pushrod carries a plunger which has a predetermined axial clearance in the inside of the piston.

This clearance is such that the valve head common to the two valves rests sealingly on one valve seat formed on the plunger and separated from one valve seat formed on the piston when the operating pushrod occupies its rear rest position. The rear chamber then communicates with the front chamber and the piston is pushed against a rear stop surface formed on the outer casing, under the action of a return spring.

Inversely, the valve head common to the two valves rests sealingly on the valve seat formed on the piston and separated from the valve seat formed on the plunger when the operating pushrod is moved forwards under the effect of an actuation of the brake pedal. The communication between the front and rear chambers is then interrupted and this latter is placed in communication with the outside atmosphere. Thus the piston of the servo-motor moves forward under the effect of the difference in pressure between the rear and the front chambers, drawing along with its movement an output rod of the servo-motor, which actuates the piston of a master cylinder of the braking circuit. The assistance during braking is thus ensured.

The preceding description makes it apparent that it is the travel available to the plunger in the inside of the piston of the servo-motor which determines successively, during the actuation of the brake pedal, the closure of the first valve by which the front and the rear chambers intercommunicate in the rest position, followed by the opening of the second valve by which the rear chamber is then placed in communication with the outside atmosphere.

In the above-mentioned document, this travel is determined by two stop members mounted inside the piston and placed between two face-to-face shoulders formed on the plunger. One of these stop members is a plate called a fixed key which is immovable in the piston and determines the maximum forward position of the plunger inside the piston during the actuation of the brake pedal. The other stop member is a tilting plate, known as a tilting key, one end of which is hinged on the fixed key and the opposite end of which is folded back to form a stop suitable to come to rest on the stop surface formed on the outer casing of the servo-motor, thus determining the maximum rear position of the plunger when the brake pedal is not actuated.

In such a servo-motor, dead travel is called the movement of the operating pushrod forward necessary for the closure of the first valve leading to an interruption of all communication between the two chambers. This dead travel, which corresponds to the play existing at rest between the valve head and the valve seat formed on the piston, depends on the precise dimensions of the piston, of the plunger, and of the tilting key. Taking into account the manufacturing tolerances of these three parts, the dead travel of the servo-motors made in this way may thus vary by considerable amounts.

In order to ensure that there is always sufficient dead travel at rest so that the front and rear chambers of the servo-motor for assistance during braking intercommunicate, most of the servo-motors for assistance during braking constructed in this way have a dead travel substantially greater than the minimum travel guaranteeing this communication.

However, this situation is not satisfactory, because it is desirable that the dead travel should be identical from one servo-motor to another and above all that it should be as small as possible, in order that the intervention of the servo-motor be practically instantaneous when the driver actuates the pedal. In practice, a dead travel of less than 0.1 mm is desirable.

The precise object of this invention is a procedure for setting the dead travel of such a servo-motor, enabling a sufficiently accurate setting to be carried out in order that the dead travel be very small (for example, less than 0,1 mm) and practically uniform from one servomotor to another, this setting being able to be carried out automatically during the assembly of the servo-motor.

According to the invention, this result is obtained by means of a setting procedure for the dead travel of a servo-motor for assistance during braking comprising an outer casing, a hollow piston, axially mobile in the casing ; a first flexible means tending to move this piston towards a rear rest position in which a bearing surface of the piston is in contact with a stop surface of the outer casing ; an operating pushrod arranged according to the axis of the piston and having a plunger at a front end ; a second flexible means tending to move the operating pushrod towards a rear rest position ; a valve head mounted sealingly in the inside of the hollow piston, around the operating pushrod ; a third flexible means tending to move the valve head forward to bring it into contact with a first valve seat formed on the plunger, when the operating pushrod occupies its rear rest position, and with a second valve seat formed on the piston, when the operating pushrod is moved forward over a distance greater than the said dead travel ; a fixed stop member mounted in the hollow piston and against which the plunger comes to rest when the operating pushrod is moved forward ; and a tilting stop member one end of which is hinged on the fixed stop member and whose opposite end has a calibrated stop, the rear rest position of the operating pushrod being determined by the plunger coming to rest on the tilting stop member, the calibrated stop being up against the stop surface of the casing; this setting procedure being characterized in that it comprises the following stages:

the plunger and its operating pushrod, the valve head, the second and third flexible means, the fixed stop member and the tilting stop member being mounted in the piston, the bearing surface of the piston is brought into contact with the reference surface, and the action of the second flexible means on the operating pushrod is neutralized, so that the valve head is pushed against the second valve seat by the third flexible means, and the stop of the tilting stop member is calibrated by giving a dimension to this stop such that when the first valve seat is in contact with the valve head, the calibrated stop in contact with the reference surface and the tilting stop member in contact with the plunger, a desired dead travel exists between the second valve seat and the valve head.

According to a preferred embodiment of the invention, the tilting stop member is not equipped initially with its stop when the bearing surface of the piston is brought to rest against the reference surface and when the action of the second flexible means on the operating pushrod is neutralized. After having brought the first valve seat into contact with the valve head, the stop is then calibrated by measuring the movement of the tilting stop member, not equipped with its stop, between the two extreme positions in which this member is in contact respectively with the reference surface and with the plunger, and by deducting the desired dead travel from this measured movement.

Preferably, the movement of the tilting stop member is then measured by moving this member between the extreme positions by means of a lever fitted with a movement sensor.

To carry out the setting, the piston is inserted initially in a setting sleeve in which the reference surface is formed, the bearing surface of the piston is pushed onto this reference surface by exerting a first load on the piston greater than the load exerted by the second flexible means, and the action of this latter on the operating pushrod is neutralized by exerting, on one end of this second flexible means normally resting on the pushrod, a second load directed in the opposite direction to the first load, this second load being less than the first and greater than the load exerted by the second flexible means.

The end of the second flexible means resting normally on a shoulder of the operating pushrod via a washer behind which a bush is located surrounding this pushrod, the second load is applied on the bush by means of a fork which is inserted in the setting sleeve.

Figure 2:
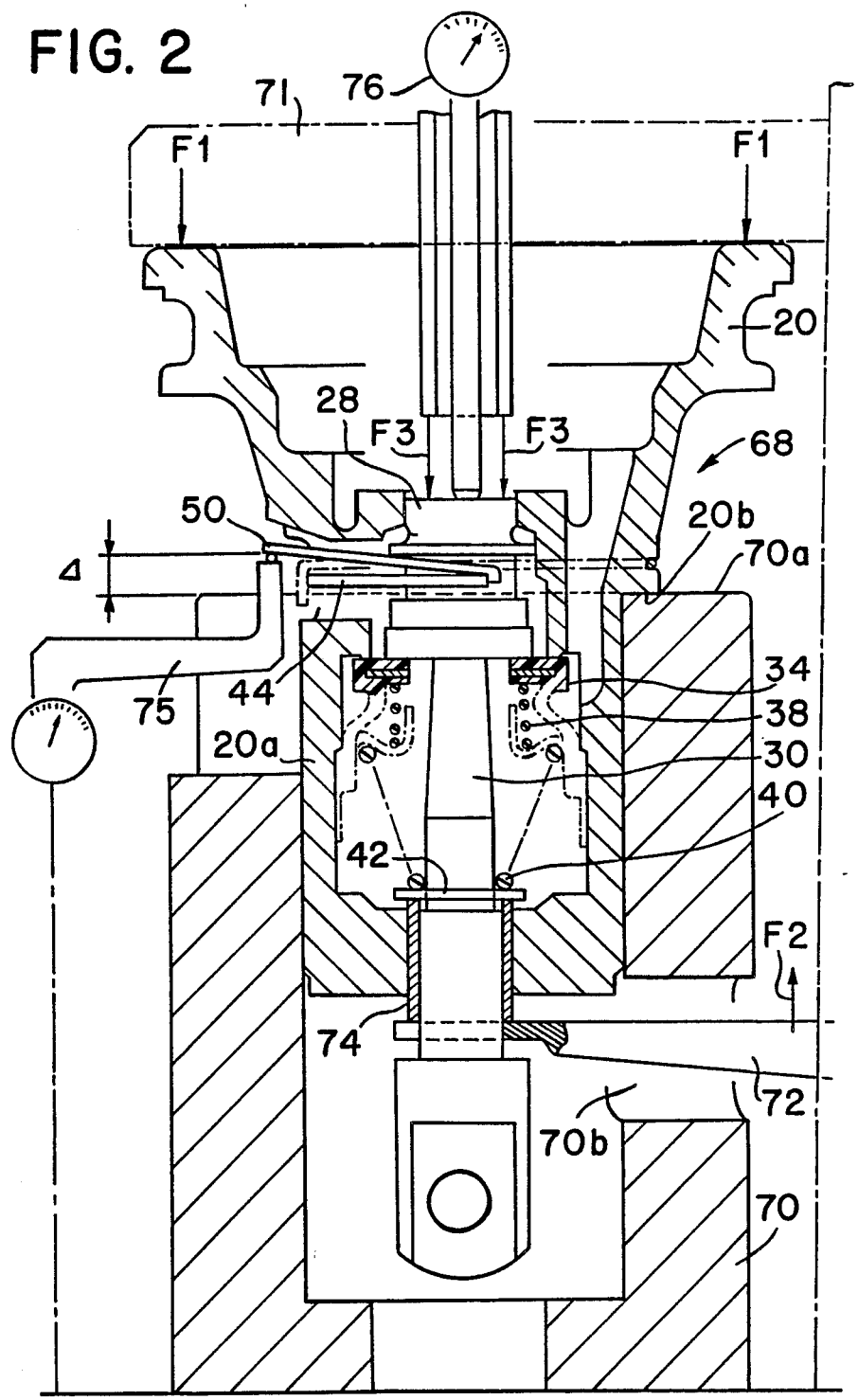
Figure 3:
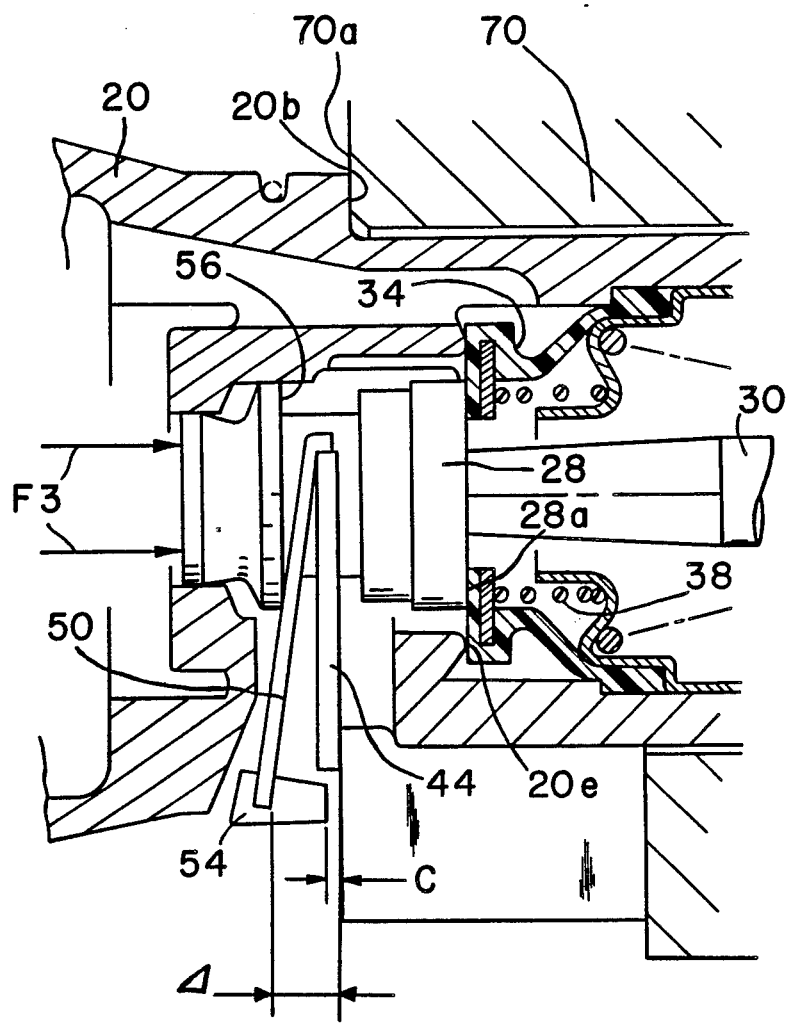

The first valve seat, particularly, may be brought into contact with the valve head by exerting a third load on the plunger directed in the same direction as the first load, this third load being less than the load exerted on the valve head by the third flexible means. A preferred embodiment of the invention will now be described, as an example in no way limiting, by referring to the attached drawings, in which:

FIG. 1 is a side view in longitudinal cross-section, representing the central part of a servo-motor for assistance during braking of which the setting of the dead travel may be carried out in accordance with the invention, the upper and lower halves of the figure illustrating respectively the positions occupied by the various parts at rest and during an assisted actuation of the brake pedal, FIG. 2 is a view in longitudinal cross-section representing a part of the servo-motor of FIG. 1 during its setting using the procedure according to the invention, and FIG. 3 is a fragmentary view representing on a larger scale the central part of the servo-motor after the calibration of the stop for the tilting key. FIG. 1 represents a part of a servo-motor for assistance during braking designed to be located in the normal way between the brake pedal of a vehicle and the master cylinder controlling the hydraulic braking circuit. By agreement, the front of the servo-motor is called the part of this latter facing the master cylinder and the rear of the servo-motor the part facing the brake pedal.

The servo-motor of FIG. 1 comprises an outer casing 10 in the shape of a shell, having a symmetry of rotation around an axis A—A. Only the rear central part of this casing 10 is shown on FIG. 1.

A flexible diaphragm of elastomer 12, reinforced by a metal supporting disc 14 in its central part, defines a front chamber 16 and a rear chamber 18 inside the space demarcated by the casing 10. The outer peripheral edge (not shown) of the diaphragm 12 is fixed sealingly on the outer casing 10, whereas the inner peripheral edge of this same diaphragm terminates by a rim 12a located sealingly in an annular groove formed in the outer peripheral surface of a hollow piston 20 arranged according to the axis A—A of the servo-motor. This hollow piston 20 extends towards the rear in the shape of a tubular part 20a which traverses sealingly the rear wall of the casing 10. The sealing of this passage is ensured by a strengthened annular seal 22 which is fixed by a ring 24 in a central tubular part 10a extending the rear wall of the casing 10 towards the rear.

The front flat face 22a of the seal 22 forms a stop surface against which a shoulder 20b, made on the outer surface of the piston 20 and forming a bearing surface, is applied when the servo-motor is at rest. The application of the bearing surface 20b against the stop surface 22a is ensured by a compression spring 25 inserted between the piston 20 and the front wall (not shown) of the outer casing 10.

In the central part located between the rear tubular part 20a and the front part in which the diaphragm 12 is fixed, the piston 20 has a stepped passage 26 comprising some longitudinal channels 27 for air circulation. The front part of this passage, of smaller diameter, accepts slidingly the front end of a plunger 28 also having a symmetry of rotation around the axis A—A. This plunger 28 is integral with the front end of an operating pushrod 30 also arranged according to the axis A—A. The rear end of this pushrod 30, which projects beyond the rear end of the tubular part 20a of the piston 20, is controlled directly by the brake pedal (not shown).

The annular space demarcated between the operating pushrod 30 and the tubular part 20a of the piston 20 opens outwards, at the back of the servo-motor, through an annular air filter 32. Towards the front, this same annular space is able to communicate with the rear chamber 18 through a radial passage 20c made in the central part of the piston, the communication being controlled by a valve which is now going to be described.

This valve comprises an annular valve seat 28a formed on the rear end face of the plunger 28 and an annular valve head 34 mounted in the tubular part 20a of the piston. This valve head 34 is integral with the front end of the smallest diameter of a flexible sleeve 35, in elastomer, whose rear end is terminated by a rim mounted sealingly inside the tubular part 20a. This rim 35a is held in place by a metal plate 36 against which a compression spring 38 presses tending to move the valve head 34 forward, to push it sealingly up against the seat 28a.

A second passage 20d is formed on the central part of the piston 20, approximately parallel to its axis A—A, to make the front chamber 16 of the servo-motor communicate with one annular chamber formed around the valve head 34, inside the tubular part 20a of the piston. The front 16 and rear 18 chambers are then able to intercommunicate through the passages 20c and 20d, under the control of one other valve. This valve is demarcated between the valve head 34 and an annular valve seat 20e formed on the rear end face of the central part of the piston 20.

A compression spring 40 rests by its front end on the plate 36 and by its rear end on a shoulder formed on the operating pushrod 30, through a washer 42. This spring 40 allows the operating pushrod 30 to be returned to the rear, on release of the brake pedal. Secondarily, it holds in place the rim 35a of the flexible sleeve 35 carrying the valve head 34.

As has been described in detail in U.S. Pat. No. 4,765,226 owned by Sociéé BENDIX FRANCE, the axial travel available to the plunger 28 inside the central part of the piston 20 is limited by two stop members.

A first of these stop members, called a fixed key, is formed by a plate 44 mounted perpendicularly to the axis A—A, in the passage 26 made in the central part of the piston 20. This plate 44 may, particularly, be entered in the slides opposite one another (not shown) made inside the piston 20, and held in place by the bentover ends of a spring 46 mounted in an annular groove formed in the piston.

The fixed key 44 is arranged opposite a shoulder 48 facing forward formed on the plunger 28. In the event of failure of the assistance, the shoulder 48 comes to rest against the key 44 to transmit mechanically the braking effort exerted on the pushrod 30 to the piston 20.

The stop members mounted in the central part of the piston 20 also comprise a tilting stop member, called a tilting key, formed by a plate 50 one end of which is hinged at 52 on the fixed key 44 and the opposite end of which projects radially through the passage 20c. In accordance with the invention, this latter end of the tilting key 50 has a calibrated member 54 suitable to come to rest against the stop surface 22a. In these conditions, as illustrated in FIG. 1, the tilting key 50 forms a certain angle with the fixed key 44 and it constitutes a stop against which a shoulder 56, made on the plunger 28 and facing the rear, may rest, so as to be opposite the shoulder 48.

A reaction disc 58 of an elastomer material is held in contact with the front face of the central part of the piston 20 by a metal cup 60. This cup 60 is fixed to the rear end of an output rod 62 of the servo-motor, the front end of which actuates the piston of a master cylinder (not shown).

When the servo-motor which has just been described is installed on a vehicle, the front chamber 16 communicates permanently with a source of vacuum.

When the brake pedal is not actuated, the various components of the servo-motor occupy the positions shown on the top half of the FIG. 1. In particular, the return spring 40 keeps the operating pushrod 30 and the plunger 28 in their extreme rear position, in which the shoulder 56 of the plunger rests against the tilting key 50, the calibrated stop 54 carried by this latter itself resting against the surface of stop 22a. In these conditions, the seat 28a of the plunger is resting sealingly on the valve head 34, this latter being separated from the seat 20e of the piston by a distance corresponding to the dead travel of the servo-motor.

The front 16 and rear 18 chambers thus intercommunicate via the passage 20d, the clearance existing between the seat 20e and the valve head 34, and the passage 20c. On the other hand, the valve controlling the communication of the rear chamber 18 with the outside atmosphere is closed. The two chambers 16 and 18 are thus under vacuum and the position of the piston 20 is determined by the action of the compression spring 25, which presses the bearing surface 20b of the piston up against the stop surface 22a.

When the driver of the vehicle actuates the brake pedal, the operating pushrod 30 and the plunger 28 move forward. This movement has no effect on the piston 20 as long as the dead travel existing between the valve head 34 and the valve seat 20e in rest position is not taken up. Then, the valve head 34 comes to rest sealingly on the seat 20e, so interrupting the communication between the chambers 16 and 18 of the servo-motor.

The movement forward of the plunger 28 in the piston 20 continues until the seat of valve 28a is slightly separated from the valve head 34. The rear chamber 18 of the servo-motor is then placed in communication with the outside atmosphere by the passage 20c, the passage formed between the seat 28a and the valve head 34 and the demarcated annular space between the tubular part 20a of the piston and the operating pushrod 30. The difference of pressure which then appears between the rear chamber 18 and the front chamber 16, still under vacuum, moves the piston 20 forward, which enables the mechanical actuation of braking to be assisted pneumatically, as long as the movement forward of the operating pushrod continues.

The movement of the rod 62 operating the master cylinder is thus ensured by the movement of the piston 20 of the servo-motor.

When the brake pedal is released, the various components making up the servo-motor regain their positions shown on the top half of FIG. 1, in particular under the action of the springs 40 and 26.

In accordance with the invention, the dead travel existing at rest between the valve head 34 and the valve seat 20e formed on the piston 20 is set at the factory, preferably automatically, during the assembly of the servo-motor. This setting enables the uniformity of the dead travel between one servo-motor and another to be guaranteed, in spite of the differences in dimensions which may exist both on the piston 20 and on the plunger 28 due to the manufacturing tolerances of these two parts. This setting also allows the dead travel to be given a very small value guaranteeing a very rapid intervention of the assistance during braking.

As illustrated in FIG. 2, the setting of the dead travel is carried out after a sub-assembly 68 comprising the piston 20, the operating pushrod 30, the plunger 28, the valve head 34, the springs 38 and 40 and the keys 44 and 50 have been assembled. On the other hand, it is to be noted that this setting is carried out before the fitting of the calibrated stop 54 to the end of the tilting key 50.

To carry out this setting, the sub-assembly which has just been described is inserted into setting sleeve 70 whose inside diameter is slightly larger than the outside diameter of the tubular part 20a of the piston 20. In consequence, only this tubular part 20a of the piston enters the inside of the sleeve 70.

By means of an appropriate member schematized at 71, such as a jack, an axial load F1 much greater than the load exerted by the spring 40 is applied on the front end of the piston 20. This load F1 permits the bearing surface 20b of the piston 20 to be held permanently against a flat reference surface 70a formed on the end of the sleeve 70, during the following operations.

A fork 72 is then introduced radially in relation to the common axis of the sub-assembly 68 and of the sleeve 70 through a hole 70b made in the sleeve. This hole opens out beyond the end of the tubular part 20a of the piston 20. The end of the fork 72 may thus be placed resting against the rear face of a bush 74 surrounding with a certain axial clearance a large diameter part of the operating pushrod 30, located at the back of the shoulder, on which the washer 42 rests. On exerting an axial load F2 on the bush 74 directed forwards by means of the fork 72, the action of the spring 40 on the operating pushrod 30 is neutralized. For this purpose, the load F2 applied on the fork 72 is greater than the in-position load of the spring 40.

The action of the spring 40 on the operating pushrod 30 being eliminated, the valve head 34 comes to rest on the seat 20e, formed on the piston (FIG. 3), under the action of the spring 38.

To complete the preparations necessary for setting, an axial load F3 is applied on the front end of the plunger 28, with the aid of any appropriate means such as a jack. The object of this load F3 is to maintain the valve seat 28a, formed on the plunger, in contact with the valve head 34 (FIG. 3). This load F3 must be less however than the minimum in-position load of the spring 38, in order that the valve head 34 also rests on the seat 20e formed on the piston. In practice, this load lies between approximately 0,7 and 0,8 daN.

When the various members forming the sub-assembly 68, assembled beforehand, occupy the positions which have just been shown, the setting of the dead travel may be carried out in the following way.

The tilting key 50, which is in the form of a simple flat plate, is brought first of all to rest on the reference face 70a of the sleeve. A probe 75 fitted with a movement recorder is then pressed against the face of the tilting key 50 applied on the reference face 70a, at the end of this key. On moving the probe 75 forward, taking the reference face 70a as a datum, the tilting key is brought along until its contact with the shoulder 56 (FIG. 3) formed on the plunger 28. This contact is detected by a movement sensor 76 held against the front end of the plunger 28. As soon as the contact between the tilting key 50 and the plunger 28 is detected by the sensor 76, the probe 75 is locked.

The value $\Delta$ of the movement of the tilting key 50 measured by the probe 75 is then used to calibrate the stop 54 (FIG. 3), before its fastening on the tilting key. In practice, the length of the calibrated stop 54 from the face of the tilting key 50 turned towards the reference face 70a is equal to the movement $\Delta$ measured, less a value c (FIG. 3) corresponding to the dead travel which it is desired to obtain on the servo-motor. This value c is close to 0,2 mm if the dead travel desired is less than 0,1 mm, taking into account the different lever arms at the stop 54 and at the stop 56, of the tilting key 50 in relation to its hinge 52.

Even though the preceding operations may be carried out manually, they are automated preferably within the framework of a process for mass assembling and setting of the servo-motor.

When the calibrated stop 54 is fixed to the end of the tilting key 50, the assembling of the servo-motor continues in conventional manner.

In a variant, it is to be noted that the calibration of the stop may be made from a sub-assembly identical to the sub-assembly 68, but in which the tilting key 50 has initially a non-calibrated stop on its end. This stop 54 is then made so as to be able to be distorted by crushing, under the effect of a load applied directly on the end of the tilting key 50 and just squashing this against the reference face formed on the end of the setting sleeve.

In this instance, the loads F1 and F2 are applied in the same manner as those which have just been described by referring to FIG. 2, in the same way as the load F3, which then has the effect of pressing the stop up against the reference surface, whereas the valve seat 28a formed on the plunger 28 remains separated from the valve head 34. The stop 54 is then crushed progressively by exerting a sufficient load on the end of the tilting key using a lever. This crushing is carried out until the valve seat 28a formed on the plunger is detected using a probe to be coming into contact with the valve head. In order to obtain the desired dead travel, this crushing is continued over a distance permitting this dead travel between the seat 20e and the valve head 34 to be obtained.

In the embodiment described earlier on referring to FIG. 2, as well as in the variant which has just been mentioned, it is to be noted that the elimination of the action of the spring 40 on the operating pushrod 30 may not be able to be obtained by means of a fork such as the fork 72 in FIG. 2, but owing to a bearing surface provided inside the setting sleeve and acting on the rear end of the bush 74 to free the washer 42 automatically from the shoulder formed on the operating pushrod when the piston 20 is pushed against the reference face 70a of the sleeve by the load F1.

The framework of the present invention would not be departed from if the setting procedure described above applied to servo-motors other than those illustrated on the drawings. For example, this procedure also applies to servo-motors described in the application for French Patent U.S. Pat. No. 4,757,749 owned by Sociéé BENDIX FRANCE. The adaptations necessary may be made without difficulty by a person skilled in the art. For example, concerning the servo-motor of the Application FR-A-2,469,589, it is sufficient to provide two calibrated stops, each one located at one of the ends of the arms of the key.

I claim:

1. Procedure for setting the dead travel of a servo-motor for assistance during braking comprising an outer casing, a hollow piston axially mobile in the casing ; first flexible means tending to move piston towards a rear rest position in which a bearing surface of the piston is in contact with a stop surface of the outer casing ; an operating pushrod arranged according to an axis of the piston and having a plunger at front end ; a second flexible means tending to move the operating pushrod towards a rear rest position ; a valve head mounted sealingly in the inside of the hollow piston, around the operating pushrod ; third flexible means tending to move the valve head forward to bring it into contact with a first valve seat formed on the plunger when the operating pushrod occupies a rear rest position, and with a second valve seat (20e) formed on the piston when the operating pushrod is moved forward over a distance greater than the dead travel; a fixed stop member mounted in the hollow piston and against which the plunger comes to rest when the operating pushrod is moved forward; and a tilting stop member one end of which is hinged on the fixed stop member and whose opposite end has a calibrated stop, the rear rest position of the operating pushrod being determined by the plunger coming to rest on the tilting stop member, the calibrated stop being against the stop surface of the casing; setting procedure being characterized in that the procedure comprises the following stages:

the plunger and operating pushrod valve head, second and third flexible means, fixed stop and the tilting stop member being mounted in the piston, the bearing surface of the piston is brought into contact with a reference surface and the force of the second flexible means on the operating pushrod is neutralized, so that the valve head is pushed against the second valve seat by the third flexible means, and the calibrated stop of the tilting stop member is calibrated by giving a dimension to calibrated stop such that when the first valve seat is in contact with the valve head, and the calibrated stop in contact with the reference surface and the tilting stop member in contact with the plunger, dead travel exists between the second valve seat and the valve head.

2. Setting procedure according to claim 1, characterized in that the tilting stop member is not equipped initially with the calibrated stop (54) when the bearing surface of the piston is brought to rest against the reference surface and when the action of the second flexible means on the operating pushrod is neutralized, and in that the stop is calibrated, after having brought the first valve seat in contact with the valve head, by measuring the movement ($\Delta$) of the tilting stop member, not equipped with the calibrated stop, between two extreme positions in which the tilting stop is in contact respectively with the reference surface and with the plunger, and by deducting the dead travel (c) from the measured movement.

3. Setting procedure according to claim 1 characterized in that the piston is inserted initially in a setting sleeve on which the reference surface is formed, the bearing surface of the piston is pushed against the reference surface by exerting a first load (F1) on the piston greater than the load exerted by the second flexible means, and the force of the second flexible means on the operating pushrod is neutralized by exerting, on one end of second flexible means normally resting on the pushrod, a second load (F2) directed in an opposite direction to the first load, second load being less than the first and greater than the load exerted by the second flexible means.

4. Setting procedure according to claim 2, characterized in that the movement of the tilting stop member is measured by moving the tilting stop member between the extreme positions by means of a movement probe.

5. Setting process according to claim 3, characterized in that, the end of the second flexible means resting normally on a shoulder of the operating pushrod via a washer behind which a bush is located surrounding the pushrod, the second load (F2) is applied on the bush by means of a fork which is inserted in the setting sleeve.

6. Setting procedure according to claim 3, characterized in that the first valve seat is brought into contact with the valve head by exerting a third load (F3) on the plunger directed in the same direction as the first load (F1), the third load being less than the load exerted on the valve head by the third flexible means.

* * * * *

UNITED STATES PATENT AND TRADEMARK OFFICE
CERTIFICATE OF CORRECTION

PATENT NO. : 4,934,249
DATED : June 19, 1990
INVENTOR(S) : JEAN-PIERRE GAUTIER and MIGUEL PEREZ It is certified that error appears in the above-identified patent and that said Letters Patent is hereby corrected as shown below:

Cover Page, item [21], delete "299,571" and insert ---229,571---.

Signed and Sealed this

Seventeenth Day of December, 1991

Attest:

HARRY F. MANBECK, JR.

*Attesting Officer*     *Commissioner of Patents and Trademarks*